US010450409B2

(12) United States Patent
Kang et al.

(10) Patent No.: US 10,450,409 B2
(45) Date of Patent: Oct. 22, 2019

(54) POLYMER POWDER AND METHOD FOR PREPARING SAME

(71) Applicant: LG Hausys, Ltd., Seoul (KR)

(72) Inventors: Kyoung-Min Kang, Seoul (KR); Sung-Yong Kang, Anyang-si (KR); Jun-Beom Shin, Suwon-si (KR); Deok-Ryul Hwang, Seoul (KR)

(73) Assignee: LG HAUSYS, LTD., Seoul (KR)

( * ) Notice: Subject to any disclaimer, the term of this patent is extended or adjusted under 35 U.S.C. 154(b) by 0 days.

(21) Appl. No.: 15/515,583

(22) PCT Filed: Sep. 25, 2015

(86) PCT No.: PCT/KR2015/010225
§ 371 (c)(1),
(2) Date: Mar. 29, 2017

(87) PCT Pub. No.: WO2016/052958
PCT Pub. Date: Apr. 7, 2016

(65) Prior Publication Data
US 2017/0291986 A1   Oct. 12, 2017

(30) Foreign Application Priority Data

Sep. 29, 2014 (KR) .................. 10-2014-0130551
Sep. 25, 2015 (KR) .................. 10-2015-0136095

(51) Int. Cl.
*C08G 63/08*  (2006.01)
*C08G 63/88*  (2006.01)
(Continued)

(52) U.S. Cl.
CPC .............. *C08G 63/08* (2013.01); *B05D 1/02* (2013.01); *C08G 63/88* (2013.01); *C08J 3/122* (2013.01);
(Continued)

(58) Field of Classification Search
CPC .............................. C08G 63/08; C08J 2367/04
See application file for complete search history.

(56) References Cited

U.S. PATENT DOCUMENTS 4,939,060 A * 7/1990 Tomiyama ........... G03G 9/0836
430/106.1
6,356,729 B1 * 3/2002 Sasaki et al. ........ G03G 9/0819
399/258
(Continued)

FOREIGN PATENT DOCUMENTS

CN      1914255 A     2/2007
CN    101918123 A    12/2010
(Continued)

OTHER PUBLICATIONS

Extended European Search Report dated Sep. 1, 2017 from European Patent Office in connection with the counterpart European Patent Application No. 15845673.1.
(Continued)

*Primary Examiner* — Alexandre F Ferre
(74) *Attorney, Agent, or Firm* — Hauptman Ham, LLP

(57) ABSTRACT

Disclosed is a polymer powder having an average particle diameter of 20 μm to 300 μm, with a particle diameter of less than 10 μm of 10 mass % or less, and a particle diameter of greater than 300 μm of 10 mass % or less. Further, disclosed is a method for preparing a polymer powder, comprising: forming a melt of a polymer; introducing a supercritical fluid into the melt of the polymer to form a mixed composition; and spraying the mixed composition to prepare the polymer powder.

13 Claims, 2 Drawing Sheets

(51) Int. Cl.
  *B05D 1/02* (2006.01)
  *C08J 3/12* (2006.01)
  *C08L 101/00* (2006.01)

(52) U.S. Cl.
  CPC ......... *C08L 101/00* (2013.01); *C08J 2300/22* (2013.01); *C08J 2367/04* (2013.01); *Y02P 20/544* (2015.11)

(56) References Cited

U.S. PATENT DOCUMENTS

| | | | |
|---|---|---|---|
| 8,585,942 | B2 | 11/2013 | Demirbüker |
| 8,585,943 | B2 | 11/2013 | Demirbüker |
| 2010/0308483 | A1 | 12/2010 | Demirbüker |
| 2010/0308484 | A1 | 12/2010 | Demirbüker |
| 2011/0200678 | A1 | 8/2011 | Hwang et al. |
| 2011/0257097 | A1 | 10/2011 | Naylor et al. |
| 2013/0309497 | A1* | 11/2013 | Takezaki ............... C08J 3/14 428/402 |
| 2014/0044819 | A1 | 2/2014 | Demirbüker |

FOREIGN PATENT DOCUMENTS

| | | | |
|---|---|---|---|
| CN | 102131498 A | 7/2011 | |
| CN | 102369234 A | 3/2012 | |
| EP | 1717263 A1 | 11/2006 | |
| JP | H08252449 A | 10/1996 | |
| JP | 2004-238432 A | 8/2004 | |
| JP | 2005-036076 A | 2/2005 | |
| JP | 2007534314 A | 11/2007 | |
| JP | 2010-018640 A | 1/2010 | |
| JP | 2010070670 A | 4/2010 | |
| JP | 2011507676 A | 3/2011 | |
| JP | 2011527329 A | 10/2011 | |
| JP | 2013133355 A | 7/2013 | |
| JP | 2014097440 A | 5/2014 | |
| KR | 100924236 B1 | 10/2009 | |
| KR | 1020100131244 A | 12/2010 | |
| WO | 2005073285 A1 | 9/2007 | |
| WO | WO-2012105140 A1 * | 8/2012 | ............... C08J 3/14 |
| WO | 2014/077206 A1 | 5/2014 | |
| WO | WO2014077206 A1 * | 5/2014 | ............... B01J 2/04 |

OTHER PUBLICATIONS

Chinese Office Action dated Mar. 14, 2018, in connection with the Chinese Patent Application No. 201580052931.9.
Japanese Office Action dated Feb. 6, 2018, in connection with the Japanese Patent Application No. 2017-517009.
Japanese Office Action dated Sep. 26, 2018 in connection with the counterpart Japanese Patent Application No. 2017-517009.
Chinese Office Action dated Nov. 1, 2018 in connection with the counterpart Chinese Patent Application No. 201580052931.9.
International Search Report for PCT/KR2015/010225 dated Jan. 6, 2016.

* cited by examiner

POLYMER POWDER AND METHOD FOR PREPARING SAME

CROSS REFERENCE TO RELATED APPLICATION

This present application is a national stage filing under 35 U.S.C. § 371 of PCT application number PCT/KR2015/010225 filed on Sep. 25, 2015 which is based upon and claims the benefit of priority to Korean Patent Application Nos. 10-2014-0130551 filed on Sep. 29, 2014 and 10-2015-0136095 filed on Sep. 25, 2015 in the Korean Intellectual Property Office. The disclosures of the above-listed applications are hereby incorporated by reference herein in their entirety.

TECHNICAL FIELD

The present disclosure relates to a polymer powder and a method for preparing the same.

BACKGROUND ART

Thermoplastic composites applied to interior materials or parts used in construction, vehicles, filters, etc. may contain polymer powder due to various purposes. For example, the composites may comprise a structure in which the powder is impregnated into fibers. In the case of such a polymer powder, the smaller the particle diameter, the more favorable the subsequent process, and the narrower the particle diameter distribution and the uniform size, the more various applications can be obtained.

Conventionally, spherical fine particles were produced at low cost by using a ball mill grinding method or a freeze grinding method. However, in the freeze grinding method, problems may arise in terms of cost and time since it uses expensive nitrogen to reduce the size of the particles and requires a multi-step grinding process. In addition, since the shape of the final particles produced by the freeze grinding method has a relatively sharp crushed shape, there is a disadvantage in terms of fluidity and various applicability requirements cannot be secured. In the case of the ball mill grinding method, the shape of particles is more spherical than those produced by the freeze grinding method. However, in order to obtain such spherical particles, a separate step of dispersing the particles in a solvent and then recovering them is required. Therefore, this is also disadvantageous in terms of cost and time, and there is a problem in that the particle diameter distribution of the produced particles is wide and uneven, and coagulation occurs easily.

Therefore, there is a need for a method for preparing a spherical powder which is advantageous in terms of cost and time, has little change in physical properties due to temperatures during production, and exhibits excellent physical properties with a narrow particle diameter distribution.

DISCLOSURE

Technical Problem

It is an aspect of the present disclosure to provide a polymer powder having a narrow particle diameter distribution and a uniform particle diameter in a certain range to ensure excellent fluidity and applicability.

It is another aspect of the present disclosure to provide a method for preparing the polymer powder which is advantageous in terms of cost and time and can minimize the change in physical properties depending on the temperatures and the like.

Technical Solution

In accordance with one aspect of the present disclosure, a polymer powder having an average particle diameter of about 20 μm to about 300 μm, with a particle diameter of less than about 10 μm of about 10 mass % or less, and a particle diameter of greater than about 300 μm of about 10 mass % or less is provided.

The polymer powder may include at least one selected from the group consisting of polylactic acid (PLA), polypropylene, polystyrene, acrylonitrile-butadiene-styrene (ABS), polymethylmethacrylate (PMMA), polyethylene glycol (PEG), thermoplastic polyurethane (TPU), polydimethylsiloxane (PDMS), high density polyethylene (HDPE), low density polyethylene (LDPE), high impact polystyrene (HIPS), polyethylene oxide (PEO), polyethylene carbonate (PEC), polyhydroxyalkanoate (PHA), polyhydroxybutyrate (PHB), and combinations thereof.

The polymer powder may have a weight average molecular weight (Mw) of from about 10,000 to about 300,000.

The polymer powder may have an angle of repose of less than about 45 degrees.

In accordance with another aspect of the present disclosure, there is provided a method for preparing a polymer powder, including: forming a melt of a polymer; introducing a supercritical fluid into the melt of the polymer to form a mixed composition; and spraying the mixed composition to prepare the polymer powder.

The melt of the polymer may be formed by melting the polymer at about 100° C. to about 290° C.

The step of forming the mixed composition may include introducing the supercritical fluid into the melt of the polymer and then pressurizing to disperse the supercritical fluid in the melt of the polymer.

The step of forming the mixed composition may include introducing the supercritical fluid into the melt of the polymer and then pressurizing to a pressure of about 50 bars to about 500 bars.

The mixed composition may be formed by introducing about 5 to about 15 parts by weight of the supercritical fluid based on 100 parts by weight of the melt of the polymer.

The supercritical fluid may include at least one selected from the group consisting of carbon dioxide, helium, nitrogen, methane, ethane, propane, ethylene, propylene, methylene, and combinations thereof.

The mixed composition may have a viscosity of about 10-3 Pa·s to about 103 Pa·s.

The step of spraying the mixed composition to prepare a polymer powder may include spraying the mixed composition through a nozzle having an average diameter of about 0.01 to about 3.0 mm.

The step of spraying the mixed composition to prepare a polymer powder may include cooling the mixed composition at about −30° C. to about 30° C. concurrently with spraying.

The difference in weight average molecular weight (Mw) between the polymer and the polymer powder may be about 200,000 or less.

The difference in thermal decomposition temperature between the polymer and the polymer powder may be about 50° C. or less.

Advantageous Effects

The polymer powder has a narrow particle diameter distribution and a small and uniform particle diameter, and thus excellent fluidity and applicability can be secured.

The method of preparing a polymer powder is advantageous in terms of cost and time, and minimizes changes in physical properties depending on the temperatures and the like, so that the polymer powder having excellent physical properties can be obtained.

BEST MODE

Figure 1:
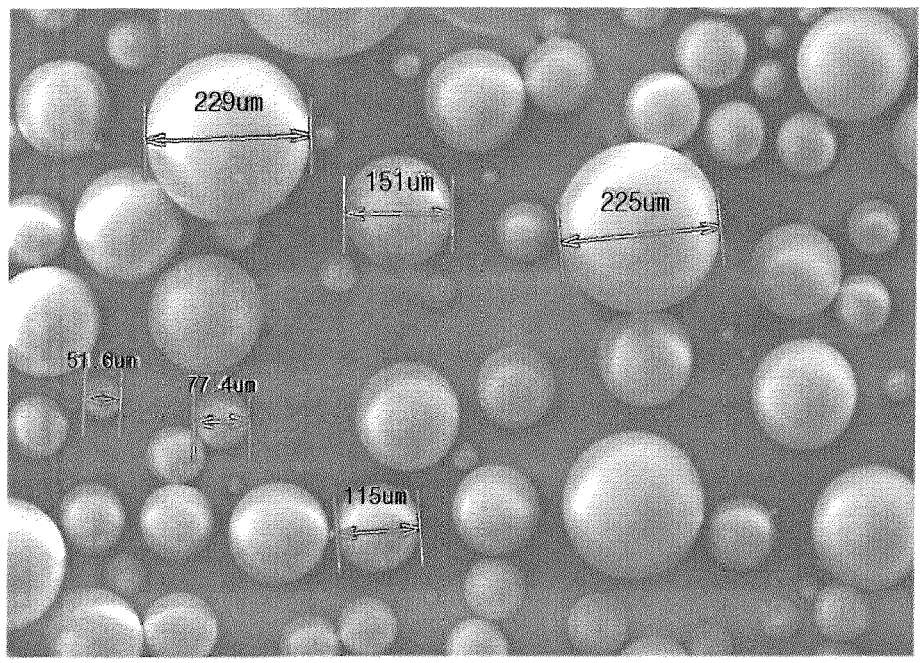
FIG. 1a is a SEM image of a polymer powder produced according to an embodiment of the present disclosure.
FIG. 1b is a SEM image of a polymer powder produced according to a conventional preparation method.
Figure 1:
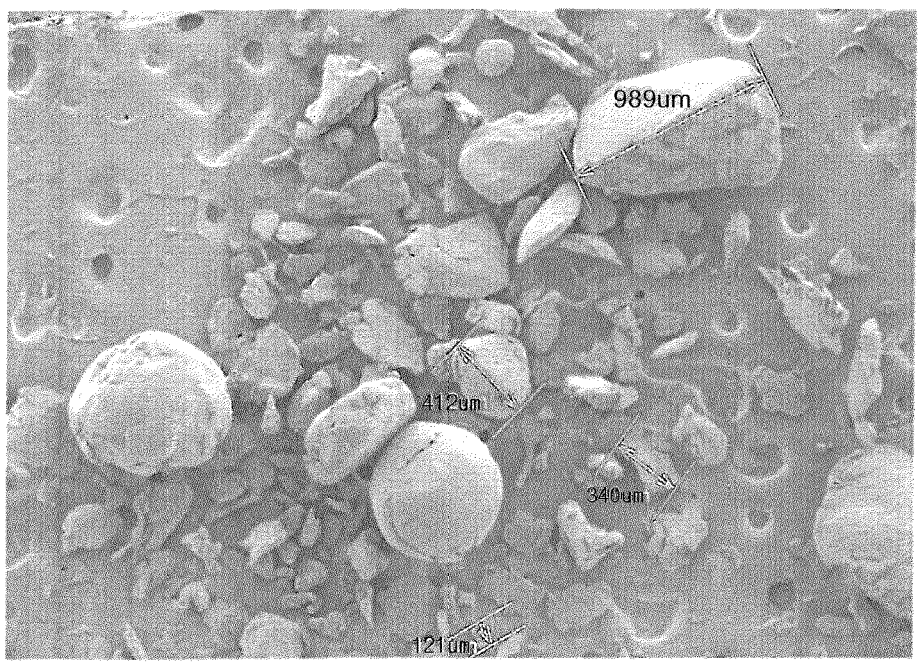

Hereinafter, the present disclosure will be described in detail by way of certain embodiments. However, it is to be understood that these embodiments are provided by way of illustrative purposes only, and the present disclosure is not limited thereto, but is only defined by the scope of the following claims and its equivalent.

One aspect of the present disclosure provides a polymer powder having an average particle diameter of about 20 μm to about 300 μm, with a particle diameter of less than about 10 μm of about 10 mass % or less, and a particle diameter of greater than about 300 μm of about 10 mass % or less.

The polymer powder has an average particle diameter of about 20 μm to about 300 μm. The polymer powder has an average particle diameter within the above range, and thus excellent workability can be secured when applied to interior construction materials and interior decorative materials based on the particle sizes.

In addition, the polymer powder may have particles having a particle diameter of less than about 10 μm and particles having a particle diameter of more than about 300 μm, of 10 mass % or less, respectively, and, for example, about 5 mass % or less, respectively. Specifically, the particles having a particle diameter of less than about 10 μm may be about 5% by mass or less, and the particles having a particle diameter exceeding about 300 μm may be about 1% by mass or less. Since the polymer powder has such a particle size distribution, excellent fluidity and moldability can be secured when applied to interior construction materials and interior decorative materials.

Specifically, the polymer powder may include at least one selected from the group consisting of polylactic acid (PLA), polypropylene, polystyrene, acrylonitrile-butadiene-styrene (ABS), polymethylmethacrylate (PMMA), polyethylene glycol (PEG), thermoplastic polyurethane (TPU), polydimethylsiloxane (PDMS), high density polyethylene (HDPE), low density polyethylene (LDPE), high impact polystyrene (HIPS), polyethylene oxide (PEO), polyethylene carbonate (PEC), polyhydroxyalkanoate (PHA), polyhydroxybutyrate (PHB), and combinations thereof.

For example, the polymer powder may include polylactic acid, and in this case, it may be easy to produce a polymer powder having an average particle size and a particle size distribution within the above range by the preparation method described below. In addition, not only an excellent fluidity and processability can be secured by the average particle size and the particle size distribution in the above-mentioned range, but also an environment-friendly effect due to the polylactic acid itself can be obtained.

The polymer powder may have a weight average molecular weight (Mw) of from about 10,000 to about 300,000, for example from about 50,000 to about 200,000. The polymer powder satisfies the weight average molecular weight (Mw) in the above range together with the average particle size and the particle size distribution within the above range, so that it can have excellent fluidity and moldability, and at the same time, an interior material to which the polymer powder is applied can have excellent strength.

The polymer powder may have an angle of repose of less than about 45 degrees, for example, less than about 40 degrees. As used herein, the term "angle of repose" indicates a maximum inclination angle at which the inclination can be maintained when granulated materials are naturally stacked on a plane. Specifically, the angle of repose can be determined by an injection stability angle measurement method for measuring an angle between a slope of stack and a flat horizontal plane with respect to the stack formed by pouring granulated materials on the flat horizontal surface. Alternatively, the angle of repose can be determined by a discharge stability angle measurement method for measuring an angle between a plane of curved surface and a planar bottom surface with respect to the curved shape formed by discharging the material through a hole made in a container having a flat bottom. As such, the polymer powder exhibits an angle of repose within the above range, so that excellent fluidity can be obtained and applicability in various fields can be ensured.

Another aspect of the present disclosure provides a method for preparing a polymer powder, including: forming a melt of a polymer; introducing a supercritical fluid into the melt of the polymer to form a mixed composition; and spraying the mixed composition to prepare the polymer powder.

The method for preparing a polymer powder uses a supercritical fluid (SCF). Specifically, the supercritical fluid may be used as an additive. Thus, since the polymer powder can be produced at a relatively low temperature, the loss of raw material can be prevented, and the polymer powder produced by the above-described preparation method can provide excellent physical properties in terms of thermal decomposition characteristics, particle size distribution, and molecular weight.

Specifically, the method may include forming a melt of a polymer. The melt of the polymer is formed by melting a raw material composed of a polymer at a predetermined temperature, and the raw material composed of the polymer may be a pellet-shaped granule.

The melt of the polymer may be formed by melting the polymer at about 100° C. to about 290° C. The polymer may be melted so as to have an appropriate viscosity without deteriorating the physical properties of the polymer itself by melting at the above range of temperatures.

The melt of the polymer may have a viscosity of about $10^{-3}$ Pa·s to about $10^3$ Pa·s. The melt of the polymer having a viscosity in this range can be well mixed with a supercritical fluid in subsequent steps and ensures good processability.

The method may include introducing a supercritical fluid into the melt of the polymer to form a mixed composition. The supercritical fluid is introduced after the melt of the polymer is formed, thereby forming a mixed composition having a suitable viscosity at a relatively low temperature.

Specifically, the step of forming a mixed composition may include introducing the supercritical fluid into the melt of the polymer and then pressurizing to disperse the supercritical fluid in the melt of the polymer. That is, the mixed composition may be a composition in which the supercritical fluid is dispersed in the melt of the polymer.

The step of forming a mixed composition may include introducing the supercritical fluid into the melt of the polymer and then pressurizing the mixture to a pressure of about 50 bars to about 500 bars, such as from about 50 bars to about 300 bars. In this step, when the pressure is maintained in the above range, the supercritical fluid can be uniformly dispersed in the melt of the polymer, and a mixed composition having a viscosity advantageous to processing can be formed.

Further, the step of forming a mixed composition may be performed at about 100° C. to about 290° C. Conventionally, when polymers or polymeric materials were melted and particles were formed by a method such as spraying, the viscosity of the melt was controlled by raising a temperature to about 300° C. or higher. When the preparation process proceeds at such a high temperature, there are problems that the loss of raw material is increased, the production cost is increased, and the resulting product is poor in the thermal characteristics. In this regard, when the step of forming a mixed composition in the above method is performed at a temperature within the above-mentioned range, a mixed composition having an appropriate viscosity can be formed by uniformly mixing with a supercritical fluid without impairing the physical properties of the polymer melt, and the resultant polymer powder can exhibit excellent thermal properties.

The step of forming a mixed composition may include introducing the melt of the polymer and simultaneously introducing a supercritical fluid into the melt of the polymer. In this embodiment, the melt of the polymer may be introduced at a rate of from about 2 to about 100 rpm and the supercritical fluid may be injected into the melt of the polymer at a flow rate of from about 0.01 to about 40 g/L. When the melt of the polymer and the supercritical fluid are injected at the speed and the flow rate within the above ranges, they can be mixed and dispersed evenly, and the viscosity of the mixed composition thus produced can be easily obtained.

The mixed composition may be formed by adding about 5 to about 15 parts by weight of the supercritical fluid based on 100 parts by weight of the melt of the polymer. The supercritical fluid is added in a small amount relative to the polymer melt, so that the polymer melt can be easily mixed with the fluid at a relatively low temperature, thereby making possible to easily produce a mixed composition having advantageous viscosities in processing without denaturing the thermal properties.

When the supercritical fluid is contained in an amount of less than about 5 parts by weight based on 100 parts by weight of the melt of the polymer, it may be difficult to secure a viscosity favorable for the processing of the mixed composition. When the supercritical fluid is contained more than about 15 parts by weight, a phase separation of the supercritical fluid may occur.

As used herein, the term "supercritical fluid" indicates a fluid which exists in a state of exceeding a critical temperature and a critical pressure inherent to a material and exhibits both gaseous and liquidus properties. Specifically, the supercritical fluid may include at least one selected from the group consisting of carbon dioxide, helium, nitrogen, methane, ethane, propane, ethylene, propylene, methylene, and combinations thereof. For example, the supercritical fluid may include carbon dioxide, which is relatively inexpensive and can be mixed well with the melt of the polymer.

The mixed composition prepared by introducing the supercritical fluid into the melt of the polymer may have a viscosity of about $10^{-3}$ Pa·s to about $10^3$ Pa·s. When the mixed composition has a viscosity within the above-mentioned range, it is easy to spray it, so that excellent processability can be secured in the production of a polymer powder, and the polymer powder thus produced can have a uniform size and a narrow particle size distribution.

The method may include spraying the mixed composition to prepare a polymer powder. In particular, the mixed composition may be sprayed through a nozzle, and more particularly, the average diameter of the nozzle may be about 0.01 to about 3.0 mm. When the average diameter of the nozzle satisfies the above range, the mixed composition can be introduced favorably, and a polymer powder having an appropriate size and narrow particle size distribution can be produced therefrom.

Specifically, the mixed composition may be sprayed after being injected into the nozzle with air, wherein the temperature of the injected air may be from about 200° C. to about 500° C., and the pressure thereof may be from about 100 psi to about 1000 psi. In addition, the rate of air injection may be from about 10 m/s to about 50 m/s. When the mixed composition is injected into a nozzle having a diameter within the above range together with air satisfying the temperature, pressure and injection rate in the above range, the polymer powder produced by spraying the mixed composition may easily secure an appropriate size and narrow particle size distribution, and may not impair the physical properties of the polymer itself.

In addition, the step of spraying the mixed composition to prepare a polymer powder may include cooling the mixed composition at a temperature of about −30° C. to about 30° C. simultaneously with spraying. When the mixed composition is cooled at the above range of temperature concurrently with spraying, the uniformity of the polymer powder size can be improved and a narrow particle size distribution can be obtained. Further, the polymer powders are not agglomerated, and excellent fluidity can be secured, and a spherical shape can be sufficiently retained.

The method of preparing a polymer powder can provide an appropriate viscosity at a relatively low temperature by using a supercritical fluid. Thus, the method can minimize the loss of raw material by heat, and the changes in physical properties such as the thermal property and the molecular weight of the polymer powder relative to the raw material can be minimized, which is advantageous in terms of securing costs and excellent physical properties.

Specifically, the raw material for producing the polymer powder is a polymer, and the polymer means a state prior to forming a melt of the polymer. The difference in weight average molecular weight (Mw) between the polymer and the polymer powder may be about 200,000 or less, and, for example, about 150,000 or less, such as, about 5,000 to 150,000. The smaller the difference in the weight average molecular weight (Mw), the smaller the loss of the raw material during the production of the polymer powder, and when the change in the weight average molecular weight (Mw) of the polymer powder relative to the raw material is within the above range, the polymer powder can easily secure excellent physical properties caused by the characteristics of the polymer itself.

In addition, the difference in the thermal decomposition temperature between the polymer and the polymer powder may be about 50° C. or less, and, for example, about 20° C. or less, such as, about 2° C. to 20° C. As used herein, the term "thermal decomposition temperature" indicates a temperature at which the polymer is decomposed by applying a heat thereto. Specifically, the thermal decomposition temperature can be measured using a thermogravimetric analysis (TGA). The smaller the difference in the thermal decomposition temperature, the smaller the change in the physical properties of the raw material during the production of the polymer powder, and when the difference in the thermal decomposition temperature between the polymer and the polymer powder satisfies the above range, the polymer powder can easily ensure excellent physical properties.

Hereinafter, specific examples of the present disclosure will be described. However, it is to be understood that these examples described below are only intended to illustrate or describe the present disclosure in more detail, and thus the present disclosure is not limited thereto.

EXAMPLES AND COMPARATIVE EXAMPLES

Example 1

A pellet-shaped polylactic acid resin was introduced into an extruder, and the polylactic acid resin was melted at a temperature of 250° C. to prepare a polylactic acid melt. Then, 5 parts by weight of supercritical fluid carbon dioxide was added based on 100 parts by weight of the polylactic acid melt, followed by pressurization to mix and disperse to prepare a mixed composition. Then, the mixed composition was injected into an injection nozzle, and sprayed into a chamber having a temperature of 20° C. and cooled to prepare a polylactic acid powder.

Comparative Example 1

A pellet-shaped polylactic acid resin was frozen and pulverized, and subjected to a ball-milling process to prepare a polylactic acid powder.

Comparative Example 2

A pellet-shaped polylactic acid resin was introduced into an extruder, and the polylactic acid resin was melted at a temperature of 250° C. to prepare a polylactic acid melt. The polylactic acid melt was elevated to 400° C., and injected into an injection nozzle, and sprayed into a chamber having a temperature of 20° C. and cooled to prepare a polylactic acid powder.

Evaluation

Figure 2:
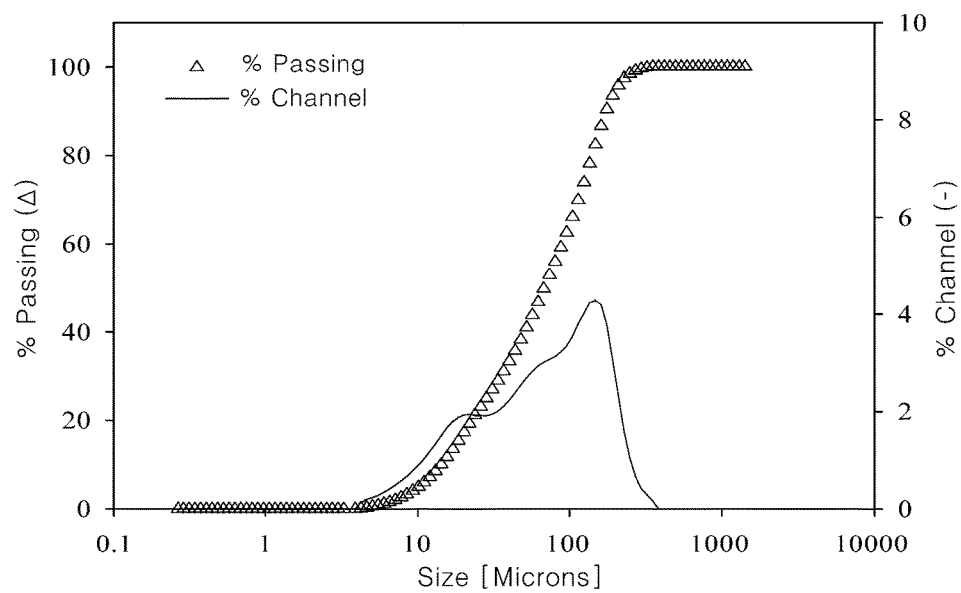
FIG. 2 shows a graph of particle diameter distribution according to a particle diameter of the polymer powder produced according to an embodiment of the present disclosure.

Experimental Example 1: Measurement of Average Particle Diameter and Particle Size Distribution With respect to Example 1 and Comparative Example 1, average particle diameter and particle size distribution were measured using a laser diffraction particle size distribution analyzer (Microtrac, S3500 Series). The results are shown in Table 1 below. FIG. 1a shows a photograph of the polylactic acid powder prepared in Example 1, and FIG. 1b shows a photograph of the polylactic acid powder prepared in Comparative Example 1. Further, FIG. 2 shows a graph of particle size distribution according to the particle size of the polymer powder prepared in Example 1.

TABLE 1

| | Average particle diameter(μm) | Particles having a particle diameter of less than 10 μm (mass %) | Particles having a particle diameter exceeding 300 μm (mass %) |
|---|---|---|---|
| Ex. 1 | 70 | 4 | 0.45 |
| C. Ex. 1 | 40 | 5 | 20 |

Experimental Example 2: Measurement of Difference in Weight Average Molecular Weight (Mw) and Thermal Decomposition Temperature ($T_{dec}$)

With respect to Example 1 and Comparative Example 2, the weight average molecular weights (Mw) of each of the pellet-shaped polylactic acid resins as raw materials and the prepared polylactic acid powders were measured and the differences were calculated, and the respective thermal decomposition temperatures ($T_{dec}$) were measured by thermogravimetric analysis (TGA) and the differences were calculated. The results are shown in Table 2 below.

TABLE 2

| | Weight average molecular weight (Mw) | | | Thermal decomposition temperature (° C.) | | |
|---|---|---|---|---|---|---|
| | pellet | powder | ΔMw | pellet | powder | $\Delta T_{dec}$ |
| Ex. 1 | 200,000 | 100,000 | 100,000 | 347.54 | 345.20 | 2.34 |
| C. Ex. 2 | 200,000 | 30,000 | 170,000 | 347.54 | 310.20 | 37.34 |

Referring to the results of Table 1 and FIG. 2, it can be seen that the polylactic acid powder of Example 1 prepared according to one embodiment of the present disclosure has an average particle diameter of 20 μm to 300 μm, with a particle size distribution in which particles smaller than 10 μm in particle size and particles larger than 300 μm in particle size are both present in a content of 10 mass % or less.

Further, through the results of FIG. 1a and FIG. 1b, it can be confirmed that the polylactic acid powder of Example 1 was produced in accordance with the method for producing a polymer powder according to one embodiment of the present disclosure, thereby exhibiting a spherical shape and exhibiting an average particle diameter within the above range.

Meanwhile, it was found that the polylactic acid powder of Comparative Example 1 prepared through the freeze-grinding and ball-milling process had a larger average particle size and an uneven particle size distribution as compared with Example 1.

In addition, referring to the results of Table 2 above, it can be seen that, as compared with Comparative Example 2, the polylactic acid powder of Example 1 prepared according to one embodiment of the present disclosure showed a decrease in the weight average molecular weight and a little change in the thermal decomposition temperature with respect to the pellet-shaped raw material in the production process, thereby realizing better physical properties due to the polylactic acid itself.

The invention claimed is:

1. A polylactic acid powder having an average particle diameter of 20 μm to 300 μm, with a particle diameter of less than 10 μm of 10 mass % or less, and a particle diameter of greater than 300 μm of 10 mass % or less, wherein a weight average molecular weight (Mw) of the polylactic acid powder ranges from 10,000 to 300,000, and wherein the polylactic acid powder has an angle of repose of less than 45 degrees.

2. A polylactic acid powder, wherein:

an average particle diameter of the polylactic acid powder ranges from 20 μm to 300 μm, an amount of particles having a particle diameter of less than 10 μm in the polylactic acid powder is 10 mass % or less, and an amount of particles having a particle diameter of greater than 300 μm in the polylactic acid powder is 10 mass % or less, a weight average molecular weight (Mw) of the polylactic acid powder ranges from 10,000 to 300,000, an angle of repose of the polylactic acid powder is less than 45 degrees, and the polylactic acid powder is prepared by a method, comprising:
  forming a melt of a polylactic acid;
  introducing a supercritical fluid into the melt of the polylactic acid to form a mixed composition; and
  spraying the mixed composition to prepare the polylactic acid powder,
  wherein the step of forming the mixed composition comprises introducing the supercritical fluid into the melt of the polylactic acid, followed by pressurizing to disperse the supercritical fluid in the melt of the polylactic acid.

3. A method for preparing the polymer power according to claim 1, comprising:
  forming a melt of a polymer,
  introducing a supercritical fluid into the melt of the polymer to form a mixed composition; and
  spraying the mixed composition to prepare the polymer powder,
  wherein forming the mixed composition comprises introducing the supercritical fluid into the melt of the polymer, and dispersing the supercritical fluid in the melt of the polymer by pressurizing the melt of the polymer and the supercritical fluid.

4. The method of claim 3, wherein the melt of the polymer is formed by melting the polymer at 100° C. to 290° C.

5. The method of claim 3, wherein the step of forming the mixed composition comprises introducing the supercritical fluid into the melt of the polymer and then pressurizing to a pressure of 50 bars to 500 bars.

6. The method of claim 3, wherein the mixed composition is formed by introducing 5 to 15 parts by weight of the supercritical fluid based on 100 parts by weight of the melt of the polymer.

7. The method of claim 3, wherein the supercritical fluid comprises at least one selected from the group consisting of carbon dioxide, helium, nitrogen, methane, ethane, propane, ethylene, propylene, methylene, and combinations thereof.

8. The method of claim 3, wherein the mixed composition has a viscosity of $10^{-3}$ Pa·s to $10^{3}$ Pa·s.

9. The method of claim 3, wherein the step of spraying the mixed composition to prepare a polymer powder comprises spraying the mixed composition through a nozzle having an average diameter of 0.01 to 3.0 mm.

10. The method of claim 3, wherein the step of spraying the mixed composition to prepare a polymer powder comprises cooling the mixed composition at −30° C. to 30° C. simultaneously with spraying.

11. The method of claim 3, wherein the difference in weight average molecular weight (Mw) between the polymer and the polymer powder is 200,000 or less.

12. The method of claim 3, wherein the difference in thermal decomposition temperature between the polymer and the polymer powder is 50° C. or less.

13. The method of claim 3, wherein introducing the supercritical fluid into the melt of the polymer comprises:
  introducing the melt of the polylactic acid at a rate ranging from 2 to 100 rpm; and
  injecting the supercritical fluid into the melt of the polylactic acid at a flow rate ranging from 0.01 to 40 g/L, and
  wherein the method further comprises, prior to spraying the mixed composition, injecting air into the mixed composition, wherein a temperature of the injected air ranges from 200° C. to 500° C., a pressure of the injected air ranges from 100 psi to 1000 psi, and an injection rate of the air ranges from 10 m/s to 50 m/s.

* * * * *